United States Patent Office 3,832,220
Patented Aug. 27, 1974

3,832,220
METHOD OF COATING PLASTIC FOAM SCRAP
William H. Plumb, Snyder, N.Y., assignor to National Gypsum Company, Buffalo, N.Y.
No Drawing. Filed Apr. 27, 1972, Ser. No. 248,245
Int. Cl. B44d 1/02
U.S. Cl. 117—100 C                           3 Claims

ABSTRACT OF THE DISCLOSURE

A method is disclosed for improving the fire resistance of chopped plastic foam, such as polyurethane foam, which include tumbling together an aqueous slurry of calcined gypsum and the chopped plastic foam particles.

---

This invention relates to converting relatively dangerous small particles of plastic foam scrap into flame-resistant and self-extinguishing particles.

In the manufacture of polyurethane foam products, such as slabs of thermal insulation, a substantial amount of scrap is unavoidably created. Approximately 10% to 15% of the starting material is commonly scrapped. This problem is thoroughly discussed in U.S. Pat. 3,594,335, wherein it is proposed to chop the scrap into particles and consolidate the particles into boards using an isocyanate binder.

This scrap has also been chopped into particles and used as loose fill insulation. These chopped particles are in a form which is quite flammable. Even the chopped scrap of foam blocks, which in block form are non-burning or self-extinguishing, can be relatively dangerous, due to the vastly increased surface area available for burning. The difference is like trying to light a log and trying to light a mass of finely divided tinder.

According to the present invention, a thin coating of an inorganic fine powder is applied to the otherwise flammable plastic foam particles.

It is an object of the present invention to convert small chopped particles of plastic foam from a flammable condition to a relatively non-flammable condition.

It is a further object to provide a process whereby such particles can be easily and economically converted to a relatively non-flammable condition.

Various other objects and advantages will appear from the following description of the invention and the novel features will be particularly pointed out hereinafter in the appended claims.

It has now been discovered that plastic foam scrap, such as that obtained from the trimming and fabrication of large slabs of rigid polyurethane foam, may be safely utilized in the form of small chopped particles for loose fill insulation. According to the present invention, the scrap is chopped or torn into particles of about $\frac{1}{16}$ inch up to about 1 inch, preferably about $\frac{1}{8}$ inch to about $\frac{1}{2}$ inch. These particles are then coated, preferably with an inorganic material having combined water in the molecules, such as gypsum, $CaSO_4 \cdot 2H_2O$, or clay, a hydrous aluminum silicate.

The coating of the particles can be done wet or dry, that is, the particles can be tumbled along with some gypsum powder or in a water slurry of gypsum powder.

EXAMPLE I

Two pounds of rigid polyurethane foam scrap was cut into .45 inch cubes. The density of the scrap in this form was .945 pound per cubic foot. Five pounds of calcined gypsum, $CaSO_4 \cdot \frac{1}{2}H_2O$, was mixed with three and a half pounds of water. The cubed scrap and the stucco slurry, of calcined gypsum and water, were then placed in a suitable rotatable container and tumbled for 30 minutes. The stucco was known to have about a 30 minute setting time, and therefore tumbling was continued for at least 30 minutes so that the coated scrap would not be bonded into a solid unit by the setting of the stucco, but instead the stucco would be uniformly coated onto the surfaces of all of the cubed scrap. The coated cubed scrap was allowed to stand at room temperature for 1 hour and then dried in an oven at 125° F. The density of the dried coated cubed scrap was 3.65 pounds per cubic foot.

This material was fire-tested in several ways. Placing a few coated cubes on a wire screen, an attempt was made unsuccessfully to light the material with a match. Subjecting this material to the flame of a propane torch for a few seconds can produce flaming of the material, however the flame goes out in one second after removal of the propane torch flame.

It was next compared to uncoated .45 inch cubes in a test which is a modified form of the flame test in Federal Specifications SSA–118b. A 30" x 30" x 4" box was made with a bottom formed of two pieces of $\frac{1}{2}$" gypsum board, each piece forming half of the box and having a $\frac{1}{8}$ inch gap between the two pieces of gypsum board. The material to be tested was placed in the box, and the bottom of the box was subjected to the flame as in the SSA–118b flame test.

With about two pounds of the uncoated scrap in the box, there was smoke produced at 7 minutes, intense smoking at 21 minutes, flame came through the mass at 27 minutes and the flame was removed at 28 minutes.

With an equal volume, or about seven pounds of the coated scrap, there was smoke produced at 7 minutes, but no intense smoking or flaming. The test was continued for the full 40 minutes. There was some ashing and carbonizing of the coated scrap particles, but no flaming.

This example may be understood to show the suitability of the invention for improving fire resistance of uncoated chopped foam scrap of about one pound per cubic foot density using sufficient amount of the inorganic coating material to increase the density to about three pounds per cubic foot for the coated product.

EXAMPLE II

Three pounds of rigid polyurethane foam scrap was chopped into fine particles of primarily about $\frac{1}{4}$ inch diameter and including some finer material. This chopped scrap was mixed with seven and a half pounds of dry stucco powder substantially all of which passes through a 200 mesh screen and is retained on a 300 mesh screen. The chopped scrap and dry stucco were tumbled in a suitable rotating container for four minutes. The stucco became evenly distributed on the surfaces of the chopped scrap.

The burning characteristics of this material were compared to the burning characteristics of similar uncoated chopped scrap. Although the scrap here involved was made from rigid polyurethane foam blocks having a non-burning rating, the uncoated chopped scrap, on a wire screen, burned completely and rapidly after easily being ignited by a propane torch flame.

The coated material, on a wire screen, could be ignited by a propane torch flame, but if the propane flame is removed on ignition of the coated material, the coated material flames goes out immediately. If after ignition of the coated scrap, the propane flame is kept on the coated scrap for about 15 seconds, the coated scrap will continue to burn for about 30 seconds after removal of the flame, thus being rated self-extinguishing.

A modified SSA–118b flame test, as described in Example I, was also run on the material of Example II. About nine pounds of the dry stucco coated scrap was placed in the box and subjected to the flame through the $\frac{1}{8}$" gap in the gypsum board bottom. After 40 minutes, no flames appeared. The coated scrap material had melted at just over the 1/8" gap forming a cavity.

EXAMPLE III

About 20 grams of the chopped scrap, as used in Example II was tumbled in a container along with about 50 grams of Georgia Kaolin Clay Company's Kaophobe 2, a fine kaolin clay. A uniform coating was formed on the scrap producing a self-extinguishing product.

EXAMPLES IV–VIII

Whereas stucco is a calcined gypsum, $CaSO_4 \cdot \frac{1}{2}H_2O$, land plaster is an uncalcined gypsum, $CaSO_4 \cdot 2H_2O$. Dry land plaster in a fineness of between about 200 mesh and 300 mesh was tumbled for about 4 minutes with the foam scrap as used in Examples II and III, in ratios of land plaster to foam of 2.5:1, 1.5:1, 1:1, .5:1 and .25:1, with the following results:

IV. 2.5:1—very non-burning
V. 1.5:1—self-extinguishing; flame lingers 3–5 seconds after removal of Bunsen burner
VI. 1:1—self-extinguishing; flame lingers 3–5 seconds after removal of Bunsen burner
VII. .5:1—self-extinguishing; flame lingers 5–8 seconds after removal of Bunsen burner
VIII. .25:1—borderline self-extinguishing; flame lingers 30–40 seconds after removal of Bunsen burner.

In comparison to the above, fine quicklime and fine carbon black powders were tumbled with the rigid polyurethane foam scrap and did not produce self-extinguishing products.

Althought the minimum size of scrap particles which may be used to produce a useful self-extinguishing product is that size in which some of the original cells of the foam are left intact to provide heat insulation, generally particles of at least 1/16 inch are recommended to maintain good insulation values.

Although the minimum size of scrap particles which 200 mesh, a material which is substantially all minus 100 mesh in particle size has been formed to provide substantially equivalent self-extinguishing properties.

It is believed the inorganic coatings on the foam scrap substantially reduce the surface area of potentially flammable foam material, act as heat radiation barriers or lower the surface temperature of the scrap particles or combinations of these effects.

Other potentially flammable lightweight plastic particles to which fine inorganic particles will mechanically or electrostatically attach themselves may also be relatively flame-proofed in accordance with the present invention.

It will be understood that various changes may be made in the principles and practice of the present invention as set forth in the following claims.

What is claimed is:

1. The method of improving the fire resistance of chopped plastic foam particles of a particle size of from about 1/16 inch to about one inch comprising the steps of chopping plastic foam into particles of said particle size, applying a thin coating of an inorganic material having molecules containing combined water therein to the surface of said plastic foam particles, applying said coating by tumbling together a plurality of said plastic foam particles and a predetermined weight ratio of said coating material and substantially uniformly distributing said coating on said particles at a weight ratio of coating to plastic foam particles of from about .5:1 to about 2.5:1, said coating material being a settable calcined gypsum stucco, present during tumbling in a water slurry, and said tumbling being continued for a period of time at least as long as the approximate setting time of said stucco.

2. The method of claim 1 wherein said plastic foam particles are made by chopping scrap portions of rigid polyurethane foam.

3. The method of claim 2 wherein said chopped plastic foam particles have a density before coating of about one pound per cubic foot and after coating of about three pounds per cubic foot.

References Cited
UNITED STATES PATENTS

| | | | |
|---|---|---|---|
| 3,741,929 | 6/1973 | Burton | 106—15 FP |
| 1,966,271 | 7/1934 | Twiss et al. | 117—136 |
| 3,108,016 | 10/1963 | Longstreth et al. | 117—100 C X |
| 3,262,894 | 7/1966 | Green | 260—2.5 AJ |
| 3,633,675 | 1/1972 | Biederman | 106—15 FP X |
| 3,061,468 | 10/1962 | Tryon | 260—2.5 FP X |
| 3,508,953 | 4/1970 | Simon et al. | 117—138.8 D X |

OTHER REFERENCES

Gibaru: Chem. Abstracts, 63:11153d, Abstract of Mater. Construc., Ultimos Avances No. 117, pp. 53–67 (1965).

WILLIAM D. MARTIN, Primary Examiner

D. C. KONOPACKI, Assistant Examiner

U.S. Cl. X.R.

106—15 FP; 117—4, 16, 138, 138.8 D; 252—8.1; 260—2.5 AJ, 2.5 FP

PO-1050
(5/69)

UNITED STATES PATENT OFFICE
CERTIFICATE OF CORRECTION

Patent No. 3,832,220               Dated August 27, 1974

Inventor(s) William H. Plumb

It is certified that error appears in the above-identified patent and that said Letters Patent are hereby corrected as shown below:

Column 2, line 20, after the 7th word "box" ---bottom--- should be inserted.

Column 3, line 33, first word "Althought" should be ---Although---.

Column 3, line 39, "Although the minimum size of scrap particles which" should be ---Although the coating powders are preferably minus---.

Signed and sealed this 5th day of November 1974.

(SEAL)
Attest:

McCOY M. GIBSON JR.
Attesting Officer

C. MARSHALL DANN
Commissioner of Patents